(12) United States Patent
Mather et al.

(10) Patent No.: US 11,274,464 B2
(45) Date of Patent: Mar. 15, 2022

(54) FRAGMENT-, OVERPRESSURE-, RADIATION-, AND TOXIC-RESISTANT EMERGENCY SAFETY SHELTER

(71) Applicant: BAKER ENGINEERING & RISK CONSULTANTS, INC, San Antonio, TX (US)

(72) Inventors: William A. Mather, Katy, TX (US); Thomas John Mander, Converse, TX (US); John Napier Dyer, Houston, TX (US); Murtaza Ibrahimbhai Gandhi, Katy, TX (US); Alexander I. Fergusson, Houston, TX (US)

(73) Assignee: BAKER ENGINEERING & RISK CONSULTANTS, INC., San Antonio, TX (US)

( * ) Notice: Subject to any disclaimer, the term of this patent is extended or adjusted under 35 U.S.C. 154(b) by 0 days.

(21) Appl. No.: 16/243,873

(22) Filed: Jan. 9, 2019

(65) Prior Publication Data

US 2020/0087943 A1 Mar. 19, 2020

Related U.S. Application Data

(60) Provisional application No. 62/730,892, filed on Sep. 13, 2018.

(51) Int. Cl.
*E04H 9/10* (2006.01)
*F24F 11/74* (2018.01)
(Continued)

(52) U.S. Cl.
CPC ........... *E04H 9/10* (2013.01); *E04B 1/34331* (2013.01); *E04B 1/6806* (2013.01); *E04B 1/948* (2013.01);
(Continued)

(58) Field of Classification Search
CPC ......... E04H 9/10; E04H 5/02; E04B 1/34331; E04B 1/98; E04B 1/6806; E04B 1/948;
(Continued)

(56) References Cited

U.S. PATENT DOCUMENTS 2,058,543 A * 10/1936 Wooldridge ............ E04H 1/005
52/79.8
2,691,291 A * 10/1954 Henderson .......... E04B 1/34823
52/79.9
(Continued)

FOREIGN PATENT DOCUMENTS

GB 557274 A * 11/1943 ............... E04H 9/10
NO 136108 B * 1/1971
RU 2644519 C1 * 2/2018

OTHER PUBLICATIONS

Matthew James Freeman|"An Investigation of the Effects of Air Infiltration and Thermal Transmittance on the Design of a Single Low Energy Building for the UK Climate"|(2013)|University of Manchester| filename: "An_Investigation_of_the_Effects_Freeman_2013.pdf";Pertinent p. 105, paragraph 4 (Year: 2013).*
(Continued)

*Primary Examiner* — Brian D Mattei
*Assistant Examiner* — Joseph J. Sadlon
(74) *Attorney, Agent, or Firm* — McDermott Will and Emery LLP

(57) ABSTRACT

A modular safety shelter provides protection from fragment, overpressure, radiation, and toxic hazards through a combination of physical design of modular segments, of joint seals between modular segments, of door assemblies, and of HVAC control systems. The modular shelter is formed of two or more prefabricated concrete modular segments each including a built-in foundation, roof, and side walls, and a prefabricated concrete vestibule segment providing an airlock-like access to the shelter. The prefabricated modular
(Continued)

segments and vestibule segment are transported to a site and assembled to each other on-site to provide a fully enclosed space within the modular shelter. A multi-layer joint seal is formed between adjacent modular segments to prevent ingress of toxic, flammable, or thermal hazards. An integrated HVAC controller monitors toxic or flammable hazards outside and inside of the shelter, and controls HVAC systems to minimize spread of contaminants upon detecting a hazard.

19 Claims, 9 Drawing Sheets

(51) Int. Cl.
| | |
|---|---|
| E04H 5/02 | (2006.01) |
| E04B 1/343 | (2006.01) |
| E04C 5/01 | (2006.01) |
| E04B 1/94 | (2006.01) |
| E04B 1/68 | (2006.01) |
| E04B 1/98 | (2006.01) |
| E06B 5/14 | (2006.01) |
| E06B 5/18 | (2006.01) |
| E06B 5/16 | (2006.01) |
| F24F 110/65 | (2018.01) |
| E04B 1/92 | (2006.01) |

(52) U.S. Cl.
CPC ............... *E04B 1/98* (2013.01); *E04C 5/01* (2013.01); *E04H 5/02* (2013.01); *E06B 5/14* (2013.01); *E06B 5/164* (2013.01); *E06B 5/18* (2013.01); *F24F 11/74* (2018.01); *E04B 2001/925* (2013.01); *E04B 2103/02* (2013.01); *F24F 2110/65* (2018.01)

(58) Field of Classification Search
CPC ... E04C 5/01; E06B 5/14; E06B 5/164; E06B 5/18; F24F 11/74; F24F 2110/65
USPC ........................................................ 52/79.8
See application file for complete search history.

(56) References Cited

U.S. PATENT DOCUMENTS

| | | | | |
|---|---|---|---|---|
| 3,251,159 A * | 5/1966 | Trice | ............... | E04H 9/10 52/20 |
| 3,292,327 A * | 12/1966 | Van Der Lely | ........... | B28B 5/10 52/79.13 |
| 3,323,580 A * | 6/1967 | Werner | ............... | F24F 3/1405 165/217 |
| 3,438,157 A * | 4/1969 | La | ............... | E02D 29/12 52/20 |
| 3,468,081 A * | 9/1969 | Saarinen | ............... | E04B 1/04 52/79.13 |
| 3,596,417 A * | 8/1971 | Zachry | ............... | E04B 1/34823 52/73 |
| 3,724,141 A * | 4/1973 | Kelleher | ............... | E04B 1/34823 52/79.11 |
| 3,750,366 A * | 8/1973 | Rich, Jr. | ............... | E04B 1/34807 52/79.11 |
| RE28,367 E * | 3/1975 | Rich Jr. et al. | ..... | E04B 1/34807 52/79.11 |
| 3,902,287 A * | 9/1975 | Livingston | ............... | E04G 21/161 52/73 |
| 4,010,579 A * | 3/1977 | Galvagni | ............... | G06F 30/13 52/79.8 |
| 4,107,886 A * | 8/1978 | Ray | ............... | E04B 1/162 52/431 |
| RE30,229 E * | 3/1980 | Berman | ............... | E04B 1/3483 290/1 R |
| 4,194,339 A * | 3/1980 | Fisher | ............... | E04B 1/34823 52/223.1 |
| 4,255,912 A * | 3/1981 | Kovacs | ............... | E04B 1/34331 52/222 |
| 4,282,687 A * | 8/1981 | Teleskivi | ............... | E06B 5/16 428/688 |
| 4,426,060 A * | 1/1984 | Csont | ............... | E04G 11/02 249/13 |
| 4,455,801 A * | 6/1984 | Merritt | ............... | E04H 9/10 109/84 |
| 4,514,640 A * | 4/1985 | Bagnell | ............... | G21F 3/00 250/517.1 |
| 4,577,577 A * | 3/1986 | Eriksson | ............... | B63B 43/30 114/120 |
| 4,622,788 A * | 11/1986 | Paulsson | ............... | E04H 9/10 52/169.6 |
| 4,722,155 A * | 2/1988 | Ericsson | ............... | E04B 1/34336 52/79.1 |
| 4,759,158 A * | 7/1988 | Aubry | ............... | E04B 1/34823 52/79.13 |
| 4,787,181 A * | 11/1988 | Witten | ............... | E04B 1/3483 220/4.21 |
| 4,841,692 A * | 6/1989 | Coupard | ............... | E06B 5/18 109/1 R |
| 4,854,094 A * | 8/1989 | Clark | ............... | E04B 1/3483 52/79.1 |
| 5,167,098 A * | 12/1992 | Blackwelder | ............... | E04B 1/08 52/263 |
| 5,735,639 A * | 4/1998 | Payne | ............... | B65D 90/18 405/129.57 |
| 5,797,224 A * | 8/1998 | Gunthardt | ............... | E04B 1/34305 52/127.11 |
| 5,829,212 A * | 11/1998 | McKeag | ............... | E04H 9/10 52/236.3 |
| 5,983,578 A * | 11/1999 | Huttie | ............... | E04H 9/06 109/1 S |
| 5,983,678 A | 11/1999 | Enderlin et al. | | |
| 6,032,421 A * | 3/2000 | Yamada | ............... | E02D 27/12 220/4.26 |
| 6,155,005 A * | 12/2000 | McNamara | ............... | E04B 1/0007 52/169.6 |
| 6,217,441 B1 * | 4/2001 | Pearman | ............... | F24F 13/10 454/333 |
| 6,293,861 B1 * | 9/2001 | Berry | ............... | F24F 11/30 454/255 |
| 6,393,776 B1 * | 5/2002 | Waller | ............... | E04H 9/14 52/169.6 |
| 6,412,231 B1 * | 7/2002 | Palatin | ............... | E04H 9/10 109/1 S |
| 6,493,996 B1 * | 12/2002 | Alexander | ............... | E04B 1/34823 52/234 |
| 6,862,847 B2 * | 3/2005 | Bigelow | ............... | E04B 1/34321 220/1.5 |
| 6,925,761 B1 * | 8/2005 | De La Marche | ... | E04B 1/34815 52/220.1 |
| 6,938,381 B1 * | 9/2005 | Villa | ............... | E04H 9/14 52/79.1 |
| 7,484,668 B1 | 2/2009 | Eiler | | |
| 7,596,909 B1 * | 10/2009 | Gillen | ............... | E02D 27/02 52/79.1 |
| 7,637,073 B2 * | 12/2009 | Elliott | ............... | E04B 2/7457 52/745.05 |
| 7,677,832 B2 * | 3/2010 | Yee | ............... | F16L 13/113 404/40 |
| 7,827,738 B2 * | 11/2010 | Abrams | ............... | E04B 1/348 52/79.1 |
| 7,856,761 B2 * | 12/2010 | Heselden | ............... | E04H 9/10 52/22 |
| 8,082,699 B1 * | 12/2011 | Kychelhahn | ............ | E04B 1/6116 52/79.7 |
| 8,176,682 B2 * | 5/2012 | Gaviglia | ............... | E06B 7/2318 49/501 |
| 8,291,647 B2 * | 10/2012 | Esposito | ............... | E04H 1/1205 52/66 |
| 8,418,411 B2 * | 4/2013 | Garcia | ............... | B28B 7/22 52/79.1 |

(56) References Cited

U.S. PATENT DOCUMENTS

| | | | | |
|---|---|---|---|---|
| 8,547,710 B2* | 10/2013 | Ruehl | .................. | H05K 9/0001 |
| | | | | 361/816 |
| 8,549,792 B2* | 10/2013 | Heselden | .................. | E04H 9/10 |
| | | | | 52/22 |
| 8,578,672 B2* | 11/2013 | Mattox | .................. | E04B 1/948 |
| | | | | 404/74 |
| 8,756,896 B1* | 6/2014 | Elliott | ...................... | E04H 9/10 |
| | | | | 52/741.3 |
| 8,839,569 B2* | 9/2014 | Crosby, Jr. | ................ | E04H 1/00 |
| | | | | 52/79.8 |
| 9,045,877 B2* | 6/2015 | Martigli | ............... | E02D 27/013 |
| 9,316,015 B1* | 4/2016 | Elliott | ...................... | E04H 9/14 |
| 9,334,518 B2* | 5/2016 | Medoff | .................. | C12P 19/14 |
| 9,371,648 B1* | 6/2016 | Tikhovskiy | ............... | E04B 5/21 |
| 9,482,002 B2* | 11/2016 | Johnson | .................... | E04B 1/04 |
| 9,556,629 B2* | 1/2017 | Bravo | ................ | E04B 1/34823 |
| 9,822,527 B1* | 11/2017 | Ruga | ........................ | E04B 5/04 |
| 9,922,515 B2* | 3/2018 | Hoy | ........................ | G08B 15/02 |
| 10,240,337 B2* | 3/2019 | Evert | ...................... | E04H 9/10 |
| 10,265,232 B2* | 4/2019 | Yim | ........................ | A61G 10/00 |
| 10,486,330 B2* | 11/2019 | Giles | ...................... | C04B 28/02 |
| 10,492,970 B2* | 12/2019 | Merino | ................... | A61G 9/00 |
| 10,760,289 B2* | 9/2020 | Schreyer | ................ | E04B 1/348 |
| | | | | 52/79.1 |
| 10,853,460 B2* | 12/2020 | Crawford | ............ | H05K 7/20745 |
| 2005/0066589 A1* | 3/2005 | Bedell | ................ | E04B 1/34815 |
| | | | | 52/79.1 |
| 2010/0077675 A1* | 4/2010 | Seavy | ...................... | E04H 3/08 |
| | | | | 52/106 |
| 2012/0110934 A1 | 5/2012 | Mattox et al. | | |
| 2014/0137727 A1* | 5/2014 | Riley | ........................ | F41H 5/02 |
| | | | | 89/36.02 |
| 2015/0135634 A1* | 5/2015 | Hoie | .................. | B29C 44/3461 |
| | | | | 52/741.4 |
| 2019/0086116 A1* | 3/2019 | Buchanan | ................ | F24F 7/08 |

OTHER PUBLICATIONS

International Search Report and Written Opinion issued in International Patent Application No. PCT/US19/051037, dated Jan. 29, 2020.

Corrected International Search Report and Written Opinion issued in corresponding International Patent Application No. PCT/US2019/051037, dated May 4, 2020.

International Preliminary Report on Patentability issued in corresponding International Patent Application No. PCT/US2019/051037, dated Mar. 25, 2020.

* cited by examiner

FRAGMENT-, OVERPRESSURE-, RADIATION-, AND TOXIC-RESISTANT EMERGENCY SAFETY SHELTER

CROSS-REFERENCE TO RELATED APPLICATION

This application claims the benefit of U.S. Provisional Application No. 62/730,892, filed on Sep. 13, 2018 in the U.S. Patent and Trademark Office, the disclosure of which is incorporated by reference herein in its entirety.

TECHNICAL FIELD

The present subject matter relates to techniques and equipment for providing protection from hazards, including fragment, overpressure, radiation, and toxic hazards, through the use of modular safety shelters and components thereof.

BACKGROUND

Industrial facilities, such as those found in the energy, chemical, fertilizer, and pharmaceutical sectors, are susceptible to process failures that could lead to the unintentional release of hazardous materials. These facilities often have key personnel or equipment located in buildings near process areas, out of necessity or simple convenience.

Buildings, including permanent and temporary structures, are built in many shapes and sizes and are often designed for environmental conditions (wind, rain, snow, etc.) or a single hazard type (e.g., explosion). Consequently, industrial buildings are often inadequate to resist multiple hazards from explosions, jet or pool fires, or toxic gas ingress resulting in an increased risk of fatality to building occupants or loss in functionality of critical equipment.

Current metal shelter buildings at facilities may resist an explosion, but the design is normally based on the building's survivability rather than the occupants' safety and survivability, and the structure can be damaged significantly in response to an explosion. A typical 10 foot metal wall could deflect up to 12 inches prior to reaching failure. High wall accelerations associated with these deflections are capable of generating internal debris of wall mounted equipment or architectural finishes. Such metal buildings generally offer poor resistance to jet fires, resulting in a rapid rise in air temperature within the building, off-gassing of paint and architectural finish-out in contact with surfaces, causing fatalities for those personnel unable to escape, and potential loss of functionality for equipment in the building. Also, the control of air within these buildings is predominantly focused on temperature and humidity, with little thought given to the fact that the HVAC system may pull-in toxic/flammable gases, or the building may be poorly sealed, resulting in indoor fatalities via toxins, explosions, or fires.

A need therefore exists in the industry for a robust building that can be easily transported to site, erected quickly, and resist a full range of hazards (explosion, fire, toxic/flammable gas ingress, shrapnel, extreme weather, etc.), with minimum vulnerability to building occupants, equipment, or the building's continued functionality.

SUMMARY

The teachings herein alleviate one or more of the above noted problems with the providing of protection from multiple hazards, including fragment, overpressure, radiation, and toxic hazards, through the use of modular safety shelters and components thereof.

In accordance with the principles of the disclosure, a modular shelter providing resistance to fire, explosion, and toxic hazards occurring in an exterior thereof is provided. The modular shelter includes two or more prefabricated concrete modular segments each including a built-in foundation, a built-in roof, and one or more side wall(s) extending between the built-in foundation and roof; and at least one prefabricated concrete vestibule segment including a built-in foundation, a built-in roof, at least three side walls extending between the built-in foundation and roof, and external and interior doors disposed in respective side walls and respectively opening towards an exterior of the modular shelter and an interior of the vestibule segment. The two or more prefabricated concrete modular segments and the at least one prefabricated concrete vestibule segment are configured to be attached to each other to provide a fully enclosed space within the modular shelter.

In an embodiment, each side wall of each prefabricated concrete segment is configured to deflect no more than 1 inch in response to a free-field blast overpressure of up to 8 psig.

In an embodiment, the at least one prefabricated concrete vestibule segment includes an external door assembly includes a door frame, having an opening, mounted in an opening of the at least one prefabricated concrete vestibule segment and welded to steel plates embedded in a side wall of the prefabricated concrete vestibule segment; and the external door includes a multi-layer door panel configured to fit in the opening of the door frame when the external door is closed, and including a blast-resistant door inner-frame having two vertical members and a plurality of cross-members extending between the two vertical members, a first thermal insulation layer disposed to substantially fill spaces between the vertical members and the cross-members of the door inner-frame, a second thermal insulation layer disposed between the door inner-frame and the exterior, and a steel panel mounted to the exterior of the blast-resistant door inner-frame.

In an embodiment, the walls and roof of the module segments and vestibule segment are constructed with monolithic beams and columns, and the walls have horizontally oriented holes extending through a thickness thereof.

In an embodiment, the modular shelter includes a joint seal sealing a plurality of joints between the prefabricated concrete module segments, wherein the joint seal comprises a thermally resistant backer rod disposed in the joint between the segments and configured to maintain a minimum width spacing between the segments, a fire resistant intumescent sealant disposed in the joint to one side of the thermally resistant backer rod, and an exterior gas or water sealant disposed in the joint to the one side of the fire resistant intumescent sealant between the fire resistant intumescent sealant and an exterior of the joint.

In an embodiment, the modular shelter includes a joint seal sealing a plurality of joints between the prefabricated concrete module segments and the prefabricated concrete vestibule segment to limit air ingress from outside to less than 0.1 air changes per hour.

In an embodiment, the modular shelter includes a controller for a heating, ventilation, and/or air conditioning (HVAC) system configured to provide air circulation to the interior of the modular shelter, wherein the controller comprises a gas detector interface for receiving a measurement of a toxic or flammable gas concentration at a location exterior to the modular shelter, and a controller configured to control shutdown of air circulation provided by the HVAC system upon the measured toxic or flammable gas concentration exceeding a threshold concentration.

In an embodiment, the modular shelter insulates against a heat flux density of 100 kW/m² applied for 1 hour to an exterior wall such that air temperature in an interior of the modular shelter does not exceed 140° F.

Another embodiment of the present disclosure is a door assembly providing resistance to fire, explosion, and toxic hazards occurring in an exterior, including a door frame having an opening; a multi-layer door configured to fit in the opening of the door frame when the door is closed; and a heat resistant gasket providing a seal against penetration of gases, disposed between the door frame and the multi-layer door along an entire periphery of the opening. The multi-layer door includes an interior cladding and a blast-resistant door inner-frame mounted to the exterior of the interior cladding, and includes two vertical members and a plurality of cross-members extending between the two vertical members. A first thermal insulation layer includes a plurality of segments that are each disposed to substantially fill a space between the vertical members and the cross-members in the door inner-frame. A second thermal insulation layer is disposed between the door frame and the exterior, and a steel panel is mounted to the exterior of the blast-resistant door frame.

In an embodiment, the opening of the door frame has a minimum 42-inch width.

In an embodiment, the interior cladding and the steel panel include ⅛-inch thick cold-formed steel sheet.

In an embodiment, the vertical members and the cross-members of the blast-resistant door inner-frame include hollow structural section (HSS) steel-tube members that are welded to each other.

In an embodiment, the first thermal insulation layer is formed of a mineral wool.

In an embodiment, the door assembly includes an overhead closer connected to the door frame and multi-layer door.

Another embodiment of the disclosure is a joint seal for sealing a joint between prefabricated concrete segments, including a thermally resistant backer rod disposed in the joint between the prefabricated concrete segments. A fire resistant intumescent sealant is disposed in the joint to one side of the thermally resistant backer rod between the thermally resistant backer rod and an exterior of the joint, and configured to fill a width between the prefabricated concrete segments. An exterior gas or water sealant is disposed in the joint to the one side of the fire resistant intumescent sealant between the fire resistant intumescent sealant and the exterior of the joint, and configured to fill the width between the prefabricated concrete segments. An interior gas or water sealant is disposed in the joint to another side of the thermally resistant backer rod between the thermally resistant backer rod and an interior of the joint, and configured to fill the width between the prefabricated concrete segments. In an embodiment, the thermally resistant backer rod is formed of a ceramic fiber rope. In an embodiment, the exterior gas or water sealant includes a medium-modulus elastomeric sealant designed for weather-proofing.

Another embodiment of the disclosure is a controller for a heating, ventilation, and/or air conditioning (HVAC) system providing air circulation to the interior of a building, including a gas detector interface for receiving a measurement of a toxic or flammable gas concentration at a location exterior to the building, an HVAC control interface for controlling operation of the HVAC system, and a processor configured to determine whether a measured toxic or flammable gas concentration at the location exterior to the building exceeds a threshold concentration, and to control the HVAC system to shut down air circulation via the HVAC control interface upon the measured toxic or flammable gas concentration exceeding the threshold concentration. In an embodiment, the processor is further configured to actuate release of fresh air from a pressurized source into the interior of the building upon determining that the measured toxic or flammable gas concentration at the location exterior to the building exceeds the threshold concentration. In an embodiment, the processor further monitors a concentration of toxic or flammable gas inside the building and provides data to site security and management upon determining that the toxic or flammable gas concentration inside the building is at an unsafe level.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various structures and techniques disclosed herein relate to providing shelter from fragment, overpressure, radiation (e.g., including thermal radiation), and toxic hazards through a resistant emergency safety shelter building system. The building system can use building components that are manufactured offsite and transported to an installation site for final assembly, with the assembly being performed such that the building offers resistance to a full spectrum of hazards in a single package.

Reference now is made in detail to the examples illustrated in the accompanying drawings and discussed below.

Figure 1:
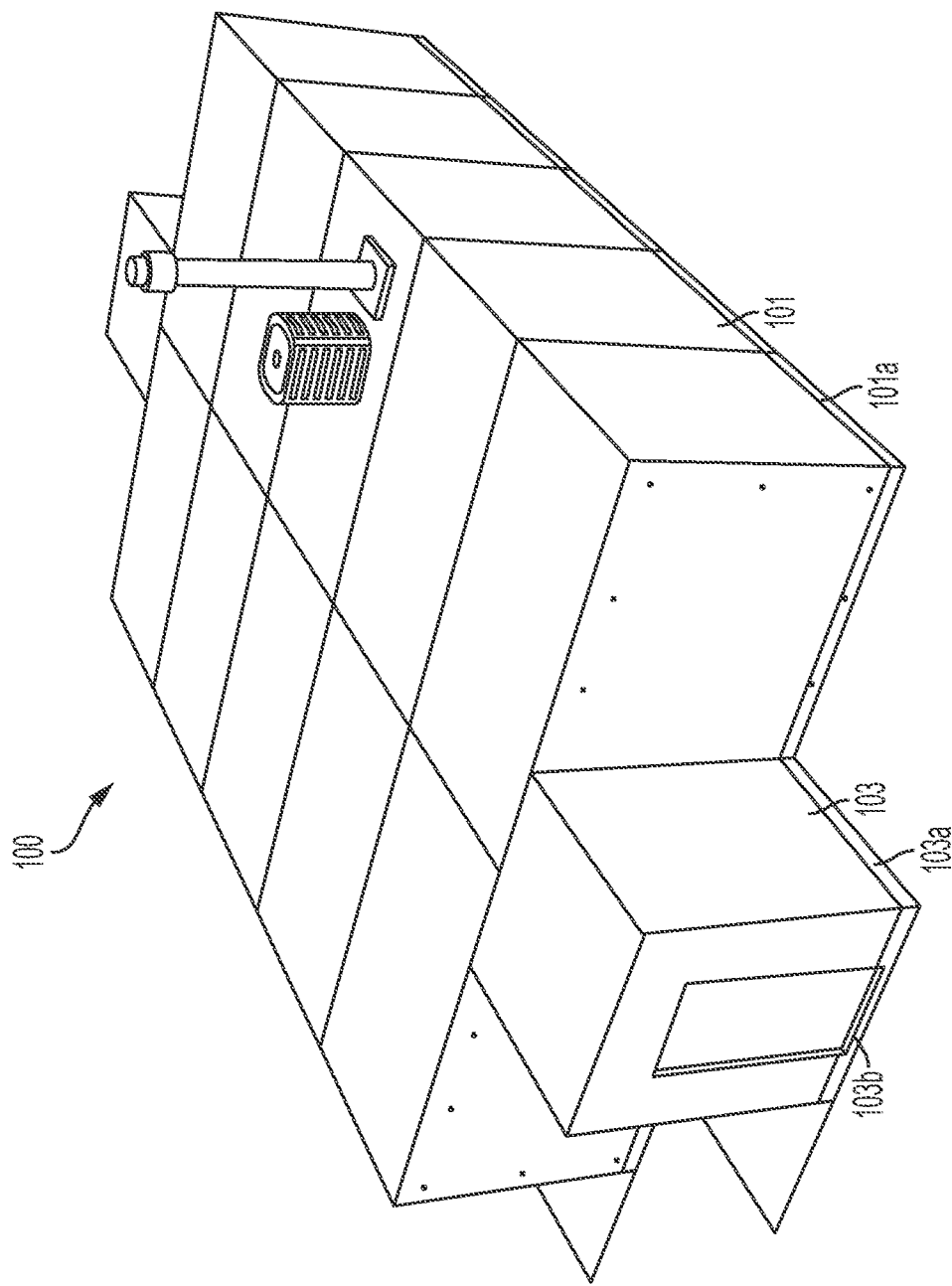
FIG. 1 is a perspective view of a modular safety shelter in accordance with the principles of the disclosure.
Figure 2A:
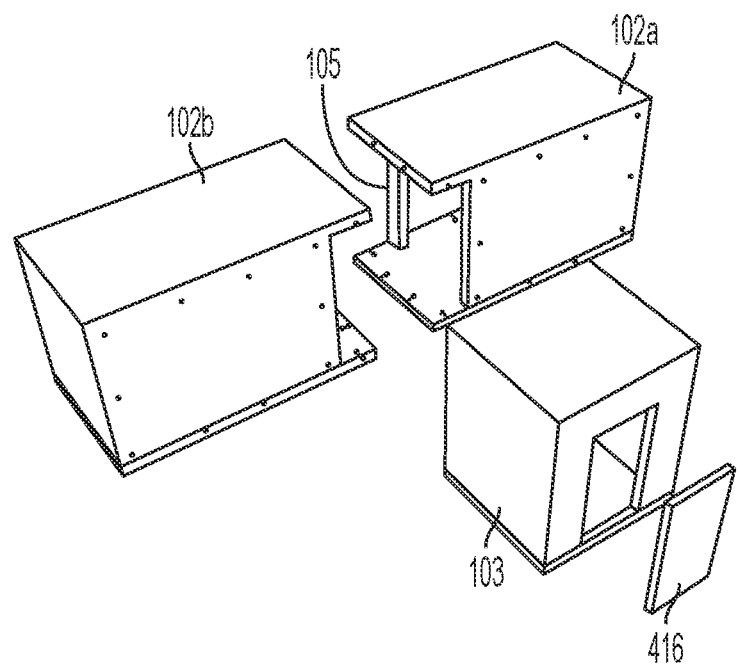
FIGS. 2A and 2B are perspective view showing assembly of modular safety shelters in accordance with the principles of the disclosure.
Figure 2B:
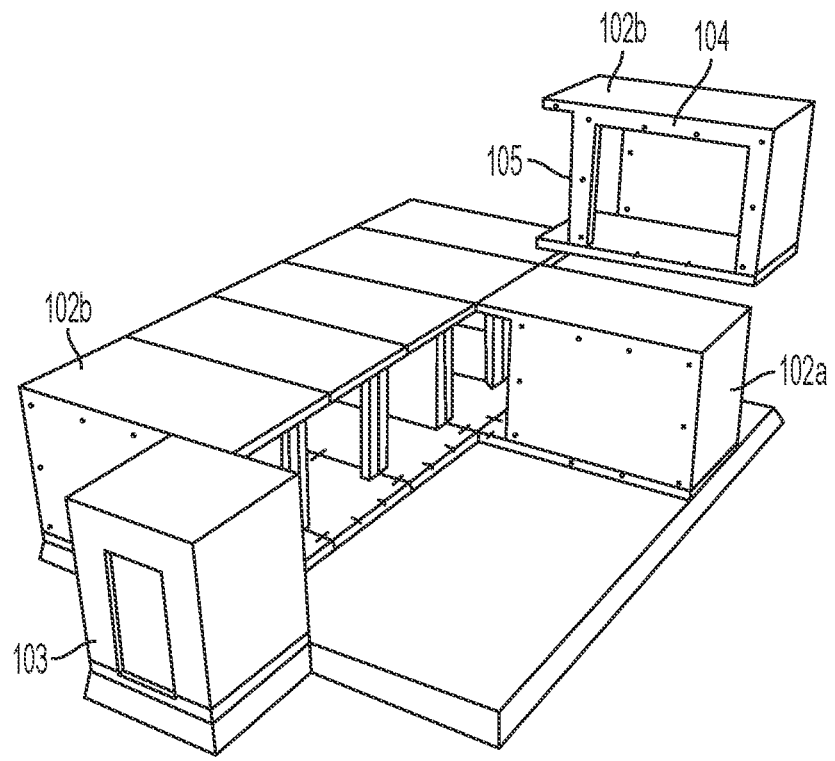

FIG. 1 is a perspective view of an illustrative modular safety shelter that is resistant to and provides protection from fragment, overpressure, radiation (e.g., including thermal radiation), and toxic hazards to persons in the shelter. FIGS. 2A and 2B are exploded perspective views showing components of the modular safety shelter and assembly methods for the components. As shown in FIGS. 2A and 2B, the walls and roof of the module segments and vestibule segment are constructed with monolithic beams 104 and columns 105.

The modular safety shelter 100 of FIG. 1 includes a plurality of modular segments 101 that can be attached to each other, as shown in the figure, to form the modular safety shelter 100. The modular segments 101 are typically prefabricated off-site and transported to the installation site where they are attached to each other. As shown, the modular safety shelter 100 can be formed to include ten modular segments 101, although different numbers or configurations of modular segments 101 can be used to form safety shelters of different sizes or configurations.

The modular safety shelter 100 of FIG. 1 further includes one or more vestibule segments 103. Each vestibule segment 103 is attached to one or more of the modular segment(s) 101 as part of forming the modular safety shelter 100 to provide a fully enclosed space within the modular shelter building. Each vestibule segment 103 includes an external doorway 103b disposed on a side of the vestibule segment 103 configured to face away from any modular segment 101 that the vestibule segment 103 is attached to, and configured to have a reinforced door assembly (see, e.g., 410 in FIG. 4C) mounted therein. The vestibule segment 103 further includes an internal doorway disposed on a side of the vestibule segment 103 configured to face the one or more modular segment(s) 101 to which the vestibule segment 103 is attached.

Each of the modular segments 101 and vestibule segments 103 includes a built-in foundation 101a, 103a as a lower member. The use of the built-in foundations 101a, 103a in each of the segments 101, 103 ensures that the modular safety shelter 100 does not require the forming of a foundation prior to construction or assembly of the segments to form the shelter. Instead, the modular safety shelter 100 can be formed directly on soil that is excavated and compacted to provide a subbase that can support 2000 psf (pounds per square foot). The subbase and base is preferably leveled using a combination of fine and coarse aggregates; in general, silt, clay, or organic materials are not used in forming the subbase and base. Utility access to the modular safety shelter 100, for example to provide electric, gas, and/or water service to the shelter, may be provided through the base/subbase so as to be protected from and resist fire, explosion, and other hazards.

In addition to the lower member, each modular segment 101 and each vestibule segment 103 includes an upper member serving as a ceiling and/or roof of the segment. The built-in roof is connected to the built-in foundation by one or more side wall(s) (in the case of modular segments 101) or at least three side walls (in the case of vestibule segments 103) extending between the built-in foundation and roof. In this regard, the side members or side walls serve as supports for the upper member.

As shown, each modular segment 101 disposed at a corner of the modular safety shelter 100 includes two side members respectively extending along width and length dimensions of the modular segment and joined to each other along a corner of the modular segment. As further shown, each vestibule segment 103 includes three or four side members, including two side members disposed on opposing sides of the vestibule segment 103 and respectively including the external doorway 103b and the internal doorway therein, and including two further side members disposed on the two other opposing sides of the vestibule segment 103 and uninterrupted by any opening. More generally, however, a modular segment 101 disposed in the middle of a side of the modular safety shelter 100 may include only a single side wall or side member, while other modular segments 101 may include three or more side walls or side members for use in smaller shelters 100 and/or for providing walls internal to the safety shelter 100.

In the embodiment depicted, in each modular segment 101, the side member extending along the width dimension of the modular segment 101 extends along the entire width of the modular segment 101, while the side member extending along the length dimension of the modular segment 101 extends along only a partial length dimension to provide an opening for providing access to a vestibule segment 103 or to an adjacent modular segment 101 in the modular safety shelter 100. Additionally, as shown in FIGS. 2A and 2B, the modular safety shelter 100 can be formed using modular segments 101 of only two different designs 102a and 102b that are mirror-images of each other, although further designs of modular segments 101 can be used to provide more varied configurations of modular safety shelters 100. As further shown in FIGS. 2A and 2B, when the modular segments 101 of the two different designs 102a and 102b are attached to each other, the side members extending along only a partial length dimension of the modular segments 101 provide adjacent openings in the side of the modular safety shelter 100 at the location at which the vestibule segment 103 can be attached to therefore provide internal connectivity and access into/out-of the vestibule segment 103. The adjacent openings can alternatively provide internal connectivity and access into/out-of adjacent modular segments 101 forming the modular safety shelter 100.

The modular segments 101 and vestibule segments 103 are formed of materials providing protection from fragment, overpressure, radiation, and toxic hazards. In one embodiment, the segments (or modules) are formed of pre-cast concrete, which provides a versatile construction medium and offers significant strength and thermal insulation characteristics. In the embodiment, the pre-cast concrete segments are manufactured off-site, under controlled conditions, at a pre-cast facility. Once the segments have been cast and cured, they are transported to a construction or installation site for offload and assembly. The on-site assembly is an efficient process that involves the segments being bolted together and sealed at the inter-segment joints to resist weather, fire, and gas ingress.

In one example, each side wall of each prefabricated concrete segment 101 and vestibule segment 103 is configured to deflect no more than 1-inch in response to a free-field triangular shock blast overpressure up to 8 psig with a 200 millisecond duration. This level of deflection allows the modular building to be immediately occupied and/or re-used following a blast event within the design range. In one embodiment, the vestibule wall with blast door and module-to-module joint was tested with simulated shock loading at full-scale. When subjected to a reflected (applied) 22 psig blast load, the vestibule wall remained undamaged. The vestibule door was tested three successive times, and only hairline cracks were observed in the concrete. The wall with joint was tested four times with incident and reflected loads, and the first reflected test displaced the wall a maximum of 1.5 inches. The testing demonstrated the re-usability of the shelter 100 and segments 101, 103 following a design-basis event.

In one embodiment, the interior of the segments 101, 103 is provided with a 4-inch wide by 4-inch deep precast chamfer, continuous at the 8-inch thick precast interior wall-to-roof interface. The chamfer as provided prevents the interior finish from being in direct contact with the interior face of the exterior precast walls. The minimum 4-inch gap between the interior face of the precast wall and the architectural/finish stud wall prevents wall-mounted debris from injuring building occupants. In an experiment, shock tube testing with a 5-inch gap between a representative precast panel and a 2×4 wood stud wall, spanning floor to roof with 16 inches on center stud spacing and ⅝ inch gypsum board sheathing secured to studs at 12 inches on center, successfully demonstrated the effectiveness of this feature. A wall-mounted picture frame and hard-hat remained in place during a shock tube test with a 22 psig applied load and duration of 200 ms.

Figure 3A:
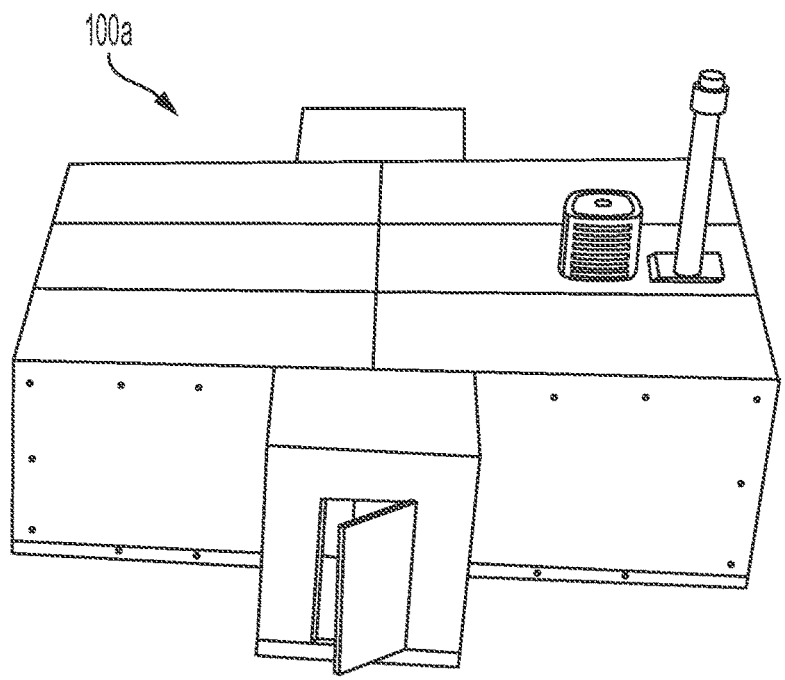
FIGS. 3A and 3B are perspective views of alternative configurations of modular segments and vestibule segments forming modular safety shelters in accordance with the principles of the disclosure.
Figure 3B:
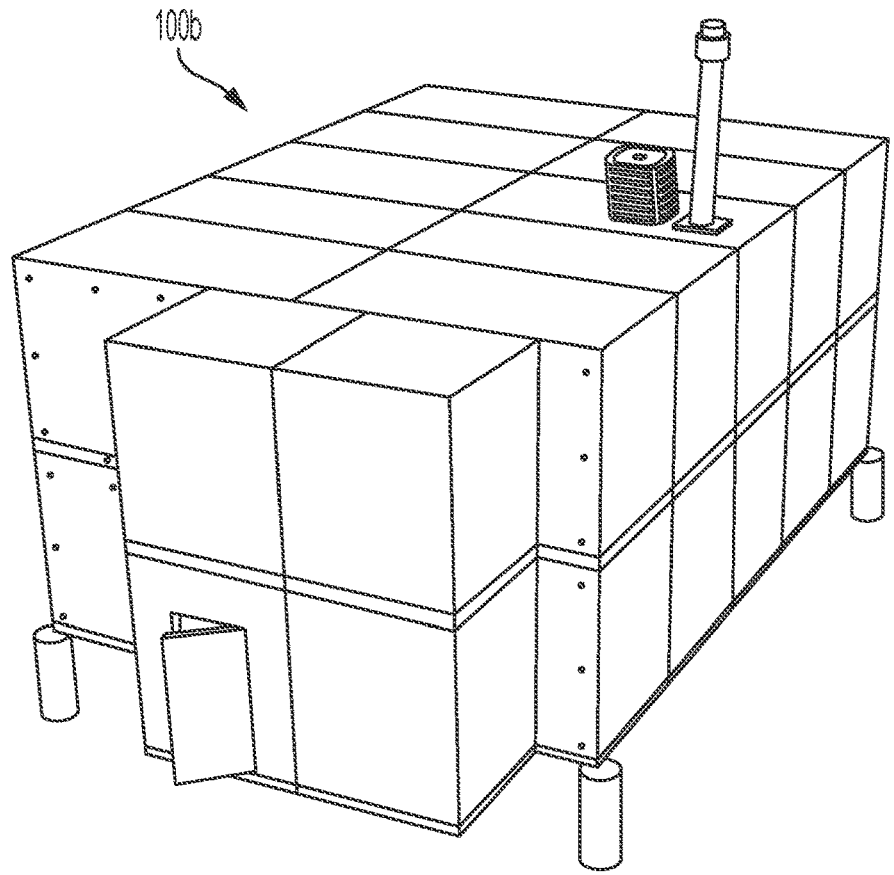

As shown in FIG. 1, a modular safety shelter 100 can include ten modular segments 101 and two vestibule segments 103 attached to each other to form a single-story structure. More generally, various numbers and combinations of modular segments 101 and vestibule segments 103 can be used to form shelters of varying design, such as the shelters 100a and 100b illustratively shown in FIGS. 3A and 3B. For example, other designs of single-story structures can include fewer segments or modules, such as the modular safety shelter 100a of FIG. 3A that includes six modular segments 101 and two vestibule segments 103 attached to each other. In another example, the segments can be used to form a multi-story structure such as the two-story modular safety shelter 100b of FIG. 3B that includes ten modular segments 101 on each of two stories, two vestibule segments 103, and additional interconnecting/stairway segments attached to each other. In a multi-story structure (see, e.g., FIG. 3B), the modular safety shelter 100 can be assembled with or without a foundation. For example, as shown in FIG. 3B, the modular safety shelter 100b can be formed with pad or pile foundations 108 disposed at corners and/or at other appropriate locations below the bottom level of the shelter to provide adequate support for the multi-story building structure.

The modular safety shelter 100 is designed to be immediately occupied, and for components (e.g., segments and modules) thereof to be reusable in multiple different sequential assemblies or projects. The segments are built to withstand explosions, including explosions below a predetermined design capacity (e.g., up to 8 psig, 200 psi-ms), with no damage so that the segments and/or entire shelter buildings (or other components thereof) can be reused following explosions below the design capacity. In view of providing protection from explosive hazards, the segments are built such that wall deflection (e.g., of side members and upper or lower members) is limited to less than 1 inch at mid-height. By ensuring limited wall deflection, the segments and shelter reduce risk of generating wall-mounted debris. Furthermore, due to the low wall deflection, explosive blast energy is not transferred to personnel or equipment inside, which limits the possibility of internal projectiles and provides an inherently safer design.

Additionally, the modular safety shelter 100 is designed to resist or withstand jet fire impingement up to a predetermined design capacity (e.g. 100 kW/m$^2$ over a 100 ft$^2$ wall surface area for 1 hour) with no damage while retaining an internal air temperature (within the modular safety shelter 100) below 140° F.

The modular safety shelter 100 can also make use of Shelter-In-Place (SIP) controls and an SIP room configuration, so as to control outside air infiltration in an emergency to much less than 0.1 Air Changes Per Hour (ACPH). In this way, the modular safety shelter 100 limits the ingress of outdoor toxic/flammable gases into the building to thereby ensure that negligible concentrations, or at worst low concentrations, of the toxic/flammable gases enter the building and improve the survivability of persons sheltered in the building.

Figure 4A:
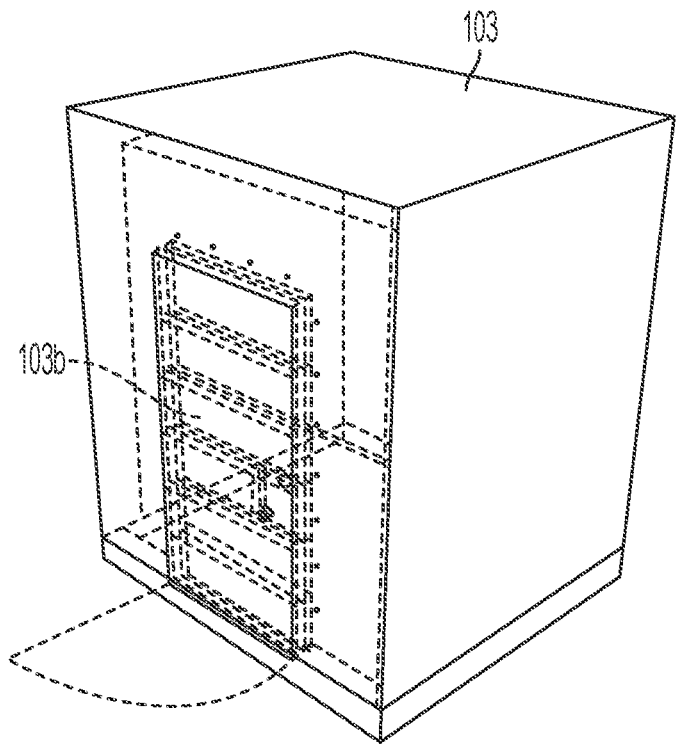
FIGS. 4A, 4B, and 4C are perspective views of a vestibule segment and a door assembly for use in modular safety shelters in accordance with the principles of the disclosure.
Figure 4B:
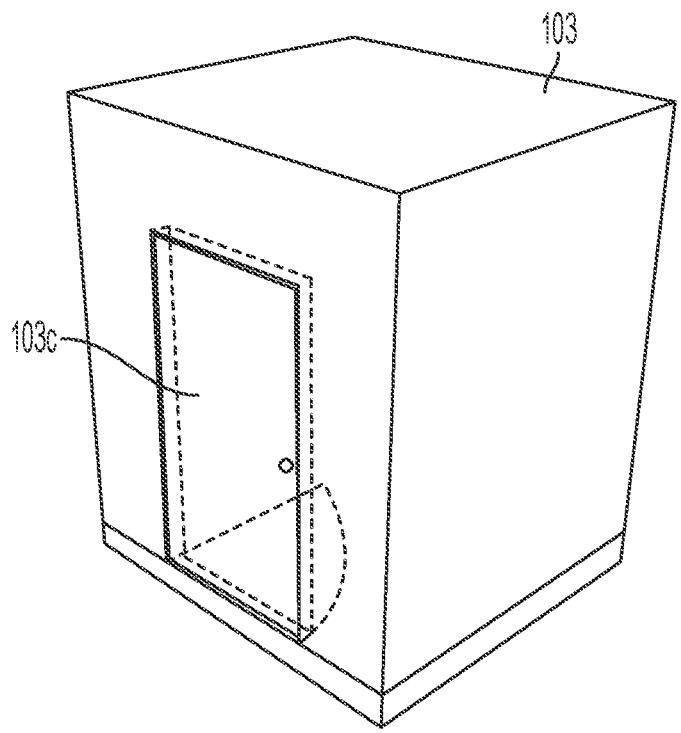
Figure 4C:
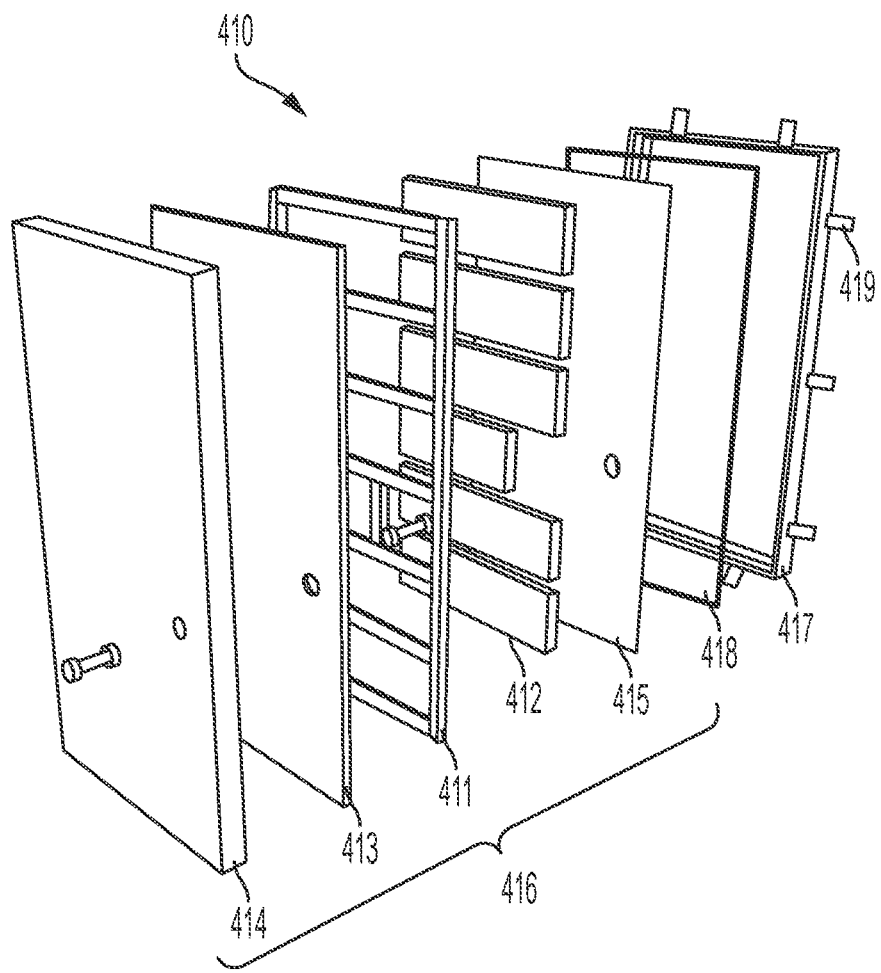

FIGS. 4A, 4B, and 4C show detailed views of a vestibule segment 103 and of a door assembly useable with the vestibule segment 103. Similarly to the modular segments 101, the vestibule segments 103 can be formed of pre-cast and pre-fabricated concrete. Additionally, as shown in FIGS. 4A and 4B, the vestibule segments 103 generally include both an external doorway 103b as well as an internal doorway 103c. The external doorway 103b is disposed on a side of the vestibule segment 103 configured to face away from any modular segment 101 that the vestibule segment 103 is attached to. The internal doorway 103c is disposed on a side of the vestibule segment 103 configured to face the one or more modular segment(s) 101 to which the vestibule segment 103 is attached.

In general, the doorways and doors are configured to allow an external door mounted in the external doorway 103b to only open outwardly from the vestibule segment 103 (e.g., towards an exterior of the modular safety shelter 100), and to allow an internal door mounted in the internal doorway 103c to only open inwardly to the vestibule segment 103 (e.g., towards an interior of the vestibule segment 103). Each doorway includes a door frame having an opening, and each door frame is mounted in the doorway opening of the vestibule segment 103. Metal plates 419 welded to the door frame are configured to extend into the vestibule segment's walls to securely hold the door frame in place. A gasket 418 is provided at an interface between each door panel and the corresponding door frame to provide a hermetic seal between the door panel and the corresponding door frame when the door is closed. The gasket extends along an entire periphery of the doorway (e.g., along 4 sides of a rectangular doorway) in order to provide a seal with high integrity.

Through the use of both internal and external doors, the vestibule segments 103 can serve as airlocks and thereby mitigate ingress of hazardous gases, heat, shrapnel, and other hazards to inner portions of the modular safety shelter 100. For example, the vestibule segments 103 can hinder ingress of toxic substances (e.g., gasses), and/or provide a first line of thermal protection against thermal hazards, in the event of an emergency. For this purpose, one or both of the inner door and the outer door includes an overhead industrial-grade closer (e.g., a hydraulic closer or other closer) to automatically close the door and to maintain pressure between edges of the door panel and a gasket mounted in the door frame when the door is closed to prevent gas ingress. Additionally, a single or double gasket can be mounted along the door frame between the door panel and door frame.

FIG. 4C shows an exploded view of a door assembly 410 such as may be used in the external doorway 103b of the modular safety shelter 100. As shown, the external door assembly 410 includes a multi-layer door panel 416 configured to fit precisely in the opening of the door frame 417 when the door is closed. The door assembly 410 further includes a gasket 418 provided between the door frame 417 and door panel 416, and configured to be in contact with both the door frame 417 and door panel 416 when the door is closed. The gasket is provided along an entire periphery of the doorway (e.g., along 4 sides of a rectangular doorway) in order to provide a seal with high integrity. In this way, the door assembly 410 provides blast resistant, thermal resistant, and airtight protection against external hazards.

The door panel 416 includes multiple layers providing reinforcement and insulation against external hazards. The external panel 416 includes a blast-resistant inner-frame 411 having a plurality of cross-members extending across an opening of the inner-frame 411, a first thermal insulation layer 412 disposed to substantially fill spaces between cross-members of the inner-frame 411, a second thermal insulation layer 413 disposed between the inner-frame 411 and the exterior, an exterior steel panel 414 mounted to the exterior of the blast-resistant inner-frame 411, and an interior panel 415 mounted to the interior of the blast-resistant inner-frame 411. Through the multi-layer structure, the door panel 416 provides blast and thermal resistant while maintaining a relatively light weight enabling the door to be operated (e.g., opened and closed) by hand.

In one embodiment, the interior panel 415 or cladding includes a ⅛-inch thick steel plate made with cold-formed steel sheet. The blast-resistant inner-frame 411 is mounted to the exterior of the interior panel 415. The blast-resistant inner-frame 411 includes a plurality (e.g., 7) cross-members formed of high-strength steel and forming steel-tube cross-members extending across an opening of the door inner-frame 411, which are welded to two vertical bearing members using welds around their entire perimeter. The vertical and horizontal members may be made of A500, Grade B, steel. The first thermal insulation layer 412 includes a plurality of mineral wool segments, each disposed to substantially fill a space between cross-members in the opening of the door inner-frame 411. The second thermal insulation layer 413 is disposed between the door inner-frame 411 and the exterior panel 414, so as to fill the entire projected area of the door steel frame. The exterior panel 414 includes ⅛-inch thick steel panel made with a same material as the interior panel 415, and mounted to the exterior of the blast-resistant door inner-frame 411. Additionally, the gasket 418 includes two layers of gaskets applied to the step-edge of the door. The outermost gasket includes a heat resistant silicone gasket providing weatherproofing and a seal against penetration of gases. The second gasket is a thermally resistant glass fiber gasket. Both gaskets 418 are disposed between the door frame 417 and the multi-layer door panel 416 along an entire periphery of the opening.

The blast-resistant external door and frame assembly 410 is assembled and affixed in a precast vestibule wall (e.g., a side member of a vestibule segment 103). In one embodiment, the door frame 417 is welded to steel plates embedded in the wall of the vestibule segment 103 using headed studs.

The external door and frame assembly 410 provides a blast-resistant barrier, a thermal-resistant barrier, and a toxic-blocking barrier while providing a means of ingress and egress to/from the modular safety shelter 100. For example, the door and frame assembly 410 can provide protection from an explosive blast at a predetermined design capacity, for example by providing protection from a 22 psig, 200 millisecond blast/explosive load applied thereto three times in individual blast tests. In one experimental example, a door panel 416 and assembly 410 exhibited a maximum permanent displacement of 0.25 inches and remained operational following the blast/explosive tests.

The internal door assembly can optionally be a specialized door assembly configured to provide resistance to and protection from blast, thermal, and toxic hazards, such as the door assembly described in relation to FIG. 4C. However, the internal doorway may alternatively be a commercial grade fire-resistant doorway, such as a door rated as being 2 hour fire resistant.

The external and internal doorways may be of varying dimensions. In one embodiment, however, the doorways are wide (e.g., 42 inches, or 3.5 feet in width) to accommodate large objects, and only a single door panel is used to close the doorways in order to provide greater strength than that provided by a double door panel configuration. Alternatively, a wide doorway may be closed using a door panel combined with a stiffened static leaf that can be temporarily removed from the door frame and replaced in the doorframe when large objects are to be carried through the doorway. In such an embodiment, the stiffened static leaf is configured to fully close the door frame opening when used in combination with the door panel.

Figure 5:
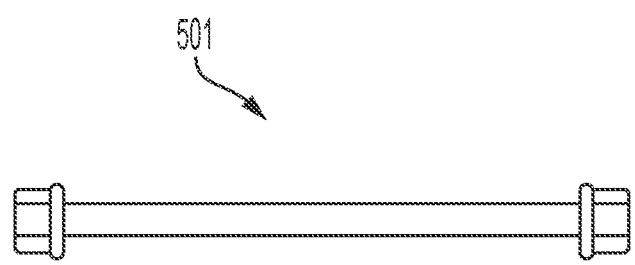
FIG. 5 shows a linkage or bolt used in attaching modular segments and vestibule segments to each other in modular safety shelters in accordance with the principles of the disclosure.
Figure 6A:
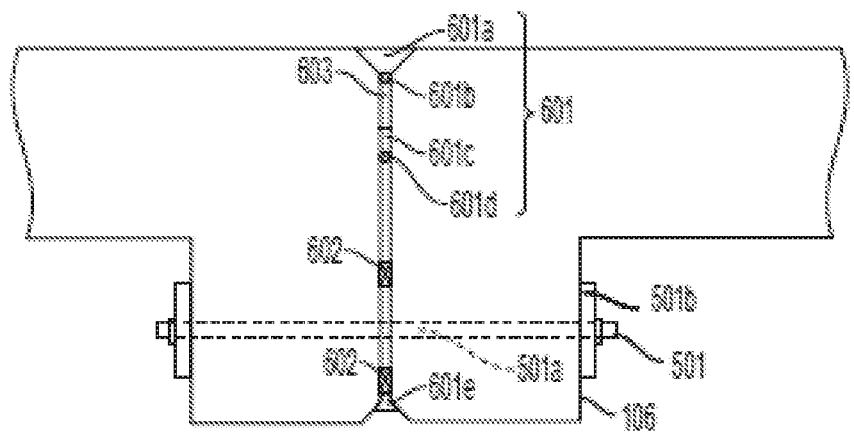
FIGS. 6A and 6B show cross-sectional views of joints formed between adjacent segments of modular safety shelters in accordance with the principles of the disclosure.
Figure 6B:
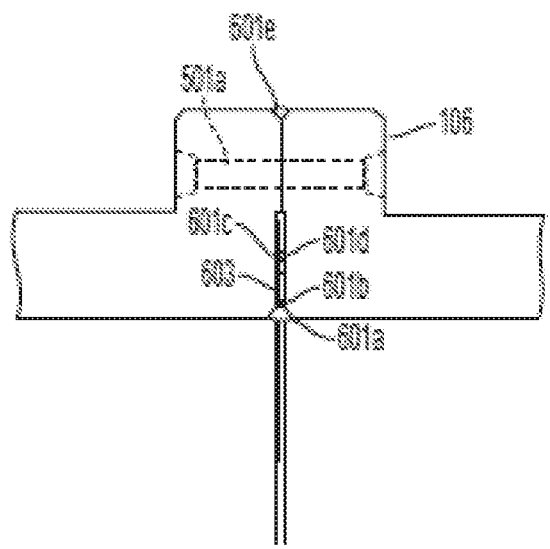

As noted in relation to FIGS. 1, 2A, 2B, 3A, and 3B above, the modular safety shelters 100, 100a, 100b are each formed of a plurality of modular segments 101 and vestibule segments 103 that are attached to each other. To provide protection from explosive, fragment, overpressure, radiation, and toxic hazards, the segments 101 and 103 are securely attached and sealed to each other using attachment linkages and seals providing protection against the various hazards. FIGS. 5, 6A, and 6B show linkages and seals providing protection against the explosive, fragment, overpressure, radiation, and toxic hazards considered in this disclosure.

As shown in FIGS. 5, 6A, and 6B, the segments 101, 103 can be bolted to each other using bolts 501. In this way, segments 101, 103 can be attached to each other by applying and tightening bolts, and can be detached from each other in a straightforward way and without damage by detaching and removing the bolts. The bolts 501 extend through bolt holes 501a extending at predetermined locations through the side walls or side members 106. Bolt holes 501a in each segment 101, 103 are provided at positions designed to align with bolt holes of other segments when the other segments are positioned adjacent to the segment for attachment to each other.

In general, bolt holes extend horizontally through the thickness of the side walls/members to enable adjacent segments to be bolted to one another. Additionally, bolt holes 501a are optionally provided in lower and upper members to enable attachment of stacked segments 101, 103 that are positioned on top of one another in multi-story structures, and the bolt holes in lower and upper members generally extend vertically through the thickness of the upper and lower members. Optionally, a metal plate 501*b* or washer is provided between a bolt 501 and the side member 106 to distribute a load applied by the bolt 501 on the side member 106 over a greater area of the side member 106.

In the illustrative embodiments shown in FIGS. 6A and 6B, the side walls/members 106 are formed of reinforced concrete with a thickness of 8 inches. In certain embodiments, the bolts 501 are provided with a length of at least 20.5" in order to provide adequate length to extend through two adjacent 8" side walls/members having a 0.5" gap therebetween. Bolts may have a 1" shaft with a head diameter of 3" and head thickness of 1"-2".

The side walls/members 106, upper members, and lower members of the segments 101, 103 formed of pre-cast reinforced concrete provide inherent resistance to thermal loading and direct flame impingement. However, in order for such resistance to extend to the modular safety shelter 100 formed of multiple attached segments 101, 103, the protection is extended to joints provided between adjacent/attached segments 101, 103. For this purpose, a joint is formed between the adjacent/attached segments 101, 103 to provide protection against explosive, fragment, overpressure, radiation, toxic, and thermal/flame hazards.

FIGS. 6A and 6B show structures of multi-layer joint seals 601 used to provide a seal from heat impingement as well as weather effects. The joint seal 601 includes multiple separate layers each providing protection against different hazards or combinations of hazards. The joint seal 601 is typically provided at all interfaces between adjacent segments 101, 103 of the modular safety shelter 100 to prevent infiltration of air, toxic chemicals, smoke, heat, flames, or the like through the joints. The multi-layer joint seal 601 was developed through repeated field testing to provide an ordered combination of joint layers providing a reliable seal.

In an example, the joint seal 601 is formed in a space 603 or gap between the adjacent prefabricated concrete segments 101, 103. The space 603 or gap, which may measure approximately 0.5 inch (e.g., range of 0.25-0.75 inch), may be maintained by providing ridges or protrusions 602 in the concrete segments 101, 103 (see, e.g., FIG. 6A), or by providing an indentation in an outer portion of the side wall contact area between adjacent concrete segments 101, 103 (see, e.g., FIG. 6B). The ridges or protrusions 602 may be formed of concrete, and formed integrally with the prefabricated concrete segments 101, 103 to maintain a minimum space 603 for formation of the joint seal 601.

In the structures shown in FIGS. 6A and 6B, the multi-layer joint seal 601 includes one or more thermally resistant spacer(s) (e.g., 601*b*, 601*d*) disposed in the joint between the prefabricated concrete segments. The thermally resistant spacers (601*b*, 601*c*) fill the width of the space between the prefabricated concrete segments to provide a backing along which further seal layers are applied. The multi-layer joint seal 601 further includes a fire proof sealant 601*c* disposed in the joint to one side of the first thermally resistant spacer 601*d* (e.g., between the thermally resistant spacer and an exterior of the joint), and an exterior gas or water sealant 601*a* disposed in the joint to the one side of the fire proof sealant 601*c* (e.g., between the fire proof sealant 601*c* and the exterior of the joint). The optional second thermally resistant spacer 601*b* is disposed between the fire proof sealant 601*c* and the exterior gas or water sealant 601*a*.

For example, as shown in FIGS. 6A and 6B, the multi-layer joint seal 601 includes one, two, or more layers of thermally resistant spacers (e.g., 601*b*, 601*d*). The spacers can be formed of a thermally resistant ceramic fiber rope disposed in the joint between the prefabricated concrete segments 101, 103, to fill the width between the segments and provide a backing onto which further seal layers are applied. For example, a ⅝" diameter ceramic fiber rope can be used for this purpose.

In an embodiment, the multi-layer joint seal 601 further includes a fire proof sealant 601*c*. The fire proof sealant 601*c* can be a fire resistant, latex-based intumescent sealant disposed in the joint to one side of the inner-most thermally resistant spacer 601*d* (e.g., thermally resistant backer rod) between the thermally resistant spacer 601*d* and an exterior of the joint (e.g., an exterior of the segments 101, 103), and configured to fill a width between the prefabricated concrete segments 101, 103. In one example, a 3M CP25WB+ sealant can be used.

The multi-layer joint seal 601 further includes the exterior gas and/or water sealant 601*a*. The exterior gas or water sealant 601*a* can include an exterior medium-modulus elastomeric sealant designed for weatherproofing. In one example, a double bead of the exterior gas or water sealant 601*a* is used, and a silicone building sealant such as Dow Corning 795 or 756SMS sealant is used. As shown in FIGS. 6A and 6B, a chamfer edge (e.g., ¾" chamfer) may be provided at an outer edge of the joint, and the exterior gas and/or water sealant 601*a* may extend across the chamfered edge.

Optionally, a space 603 in the joint between the fire proof sealant 601*c* and the exterior gas or water sealant 601*a* (or between the fire proof sealant 601*c* and the outer thermally resistant spacer 601*b*) can be filled with porous stone and/or metal panel substrates, so as to fill a width between the prefabricated concrete segments 101, 103.

In addition to the exterior gas or water sealant 601*a*, an interior gas and/or water sealant 601*e* can be provided in the joint to the other side (e.g., inner side) of the thermally resistant spacer 601*d* (e.g., between the thermally resistant spacer 601*d* and an interior of the joint), and configured to fill the width between the prefabricated concrete segments. For example, such an interior sealant 601*e* is shown in the illustrative multi-layer joint seals of FIGS. 6A and 6B.

The joint between adjacent segments 101, 103 has a sufficient depth, measured from an exterior surface of the segments 101, 103, to prevent the thermal decomposition of the interior gas and water sealant 601*e*. For example, as shown in FIGS. 6A and 6B, the joint may have a depth of 8" or more, or close to 16". In this way, the deep joint structure ensures that the joint seal 601 does not fail even in situations in which outer layers of the seal (e.g., layers of the exterior gas or water sealant 601*a*) fail due to thermal decomposition resulting from flames or other environmental hazards. For instance, in experimental testing, the inner layers of the multi-layer joint seal 601 were maintained through application of a propane jet fire for one hour in the case of a wall formed of 8" of concrete, such as those shown in FIGS. 6A and 6B.

In accordance with the design and construction features of the modular safety shelter 100 described above, the shelter provides protection from external environmental hazards through the use of reinforced pre-cast concrete walls, and through the use of vestibule segments 103 serving as air-locks and/or mud rooms at exterior entrance/exit doors to minimize ingress of hazards (e.g., shock waves, toxic chemicals, thermal dangers, or the like) into the modular safety shelter.

In general, the internal fit-out of the modular safety shelter 100 is adjusted based on needs of an end user. In particular, once a modular safety shelter 100 has been assembled by attaching together modular segments 101 and vestibule segments 103, the end user is free to configure an interior space of the shelter 100 as desired.

Figure 7:
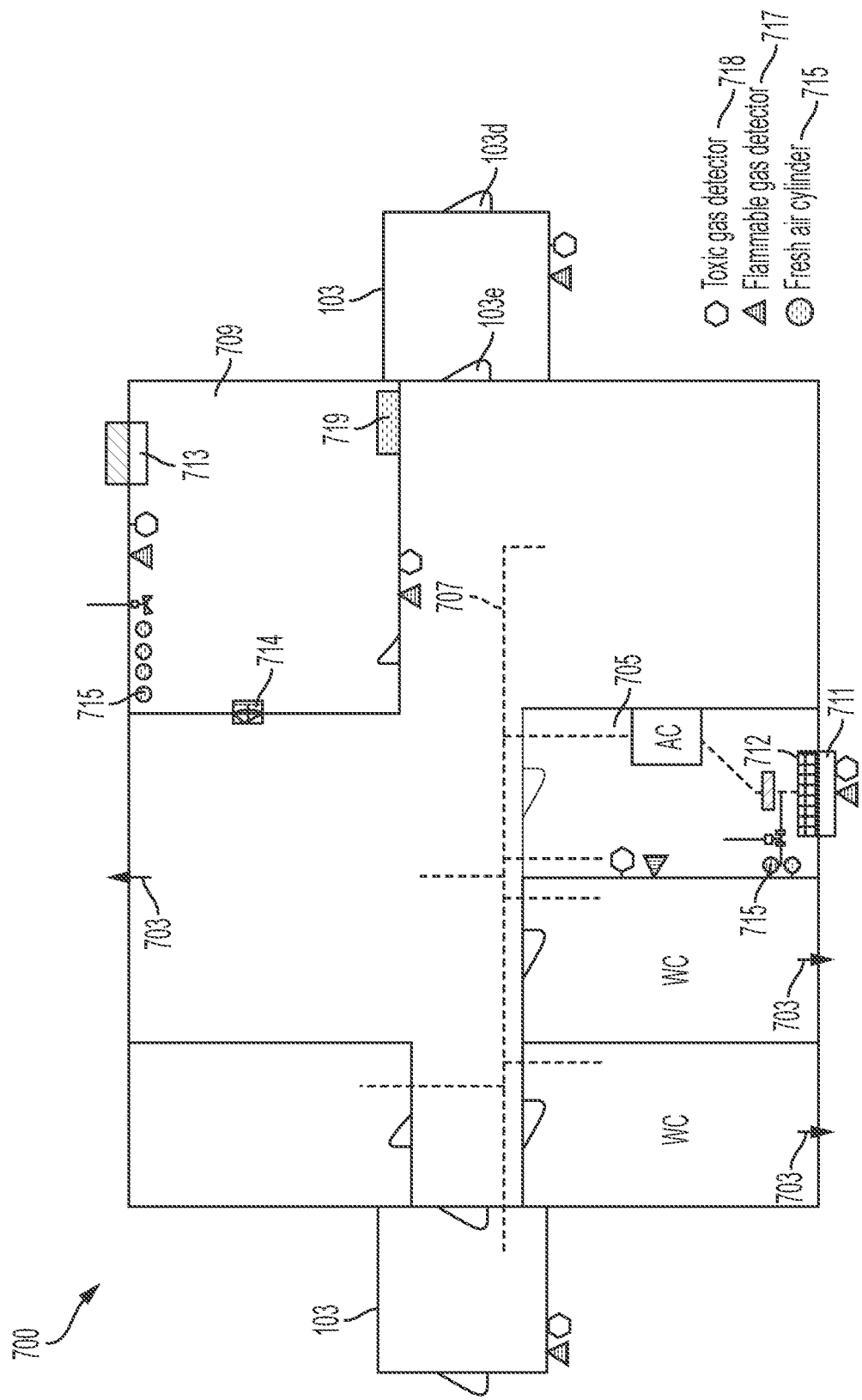
FIG. 7 is a plan view showing an internal configuration of a modular safety shelter in accordance with the principles of the disclosure.

FIG. 7 shows one illustrative configuration for a modular safety shelter 700. In the configuration, the modular safety shelter 700 is formed of 10 modular segments 101 and two vestibule segments 103. The vestibule segments 103 provide airlock and mud rooms at two entrances/exits to the shelter, and both vestibule segments include an external door 103d and an internal door 103e. Both doors open towards an exterior of the shelter 700 such that any force applied to the doors from a blast or explosion external to the shelter 700 will push the doors 103d, 103e onto their respective door frames and gasket seals to improve the seal integrity.

In addition to the external design and construction of the modular safety shelter 100 as described above, as well as the vestibule design features described above, features of the internal design and construction of the modular safety shelter 100 contribute to the protection of persons from external environmental hazards. In this respect, an interior of the modular safety shelter 700 includes multiple rooms which can be configured for various uses. Certain rooms may include extraction fans 703 operative to vent air from an interior of the shelter 700 to an exterior, such as bathrooms/water-closets (WCs) or kitchens. Each extraction fan 703 includes a damper mounted on an exterior wall or roof of the corresponding modular segment 101 and configured to close in response to an external environmental hazard. In general, the damper opens outwardly such that any force applied to the damper from a blast or explosion external to the shelter 700 will push the damper onto its frame and gasket seal and thereby improve the seal integrity. The damper can further function as a fire damper.

The shelter 700 can include a heating, ventilation, and air conditioning (HVAC) room 705 housing various HVAC systems used to provide heating, ventilation, and/or air conditioning services to various rooms in the shelter through a network of ducts 707. For example, in shelters 700 including four or more modular segments 101, one modular segment 101 or a portion thereof may be designed as the HVAC room 705. The HVAC systems may include a fresh air inlet 711 for sourcing air from an exterior of the shelter 700 into the HVAC system, and the fresh air inlet 711 includes a damper mounted on an exterior wall or ceiling/roof of the corresponding modular segment 101 and configured to close in response to an external environmental hazard. In general, the damper opens outwardly such that any force applied to the damper from a blast or explosion external to the shelter 700 will push the damper onto its frame and gasket seal and thereby improve the seal integrity. Additionally, a fire damper 712 is provided at an interior of the air inlet 711. For example, in the illustrative embodiments shown in FIGS. 1, 3A, and 3B, the fresh air intake stack and the HVAC outside compressor unit are shown as being provided on the roof of the shelters 100, 100a, and 100b. Beneath the fresh air intake stack, and within the mechanical handling room 705, are blast, fire and regular HVAC air duct dampers. Between the regular HVAC damper and the blast/fire damper is a compressed air supply (connected to cylinder 715) that acts as a sealant during an emergency to prevent outside air flow into the shelter 700.

At least some walls and doors internal to the shelter 700 may be fire-proof (e.g., 2 hour fire resistant), including the internal walls and doors of the HVAC room 705. The door of the HVAC room 705 preferably opens into the room rather than outward into the corridor.

The shelter 700 can further include a shelter-in-place (SIP) room 709. The SIP room 709 provides an internal space that provides improved protection from external environmental hazards as compared to an exterior of the shelter 700 and as compared to other rooms internal to the shelter 700. For instance, the SIP room 709 generally has no ducts 707 extending into the room, and is thus not connected to the building HVAC air duct system, so as to avoid or reduce the ingress of contaminants into the room. Instead, to provide HVAC services to the SIP room 709 without exchanging air with other parts of the shelter, the SIP room 709 includes a closed-loop heating and cooling system 713 that provides heating and/or cooling without admitting external air into the room. The closed-loop heating and cooling system 713 can include a heat exchanger external to the shelter 700, but does not exchange air with the outside of the shelter 700. Optionally, the SIP room further includes a wall fan 714 equipped with a damper that can move air into or out of the SIP room 709 and other rooms of the shelter 700, for example to move stale air from the SIP room 709 to outer rooms/corridors.

The SIP room 709, and optionally the HVAC system, is provided with fresh air cylinders 715 that can be used in case of a detected toxic hazard to provide fresh air to the SIP room 709 and/or to other portions of the interior of the shelter 700 through the ducts 707. The fresh air cylinders can also be used to increase an air pressure within the SIP room 709 so that the SIP room 709 is pressurized relative to the outside and/or relative to interior of the shelter 700 to further hinder the ingress of toxic contaminants therein, and/or to purge contaminated air out of the SIP room 709. The fresh air cylinders 715 additionally provide fresh air and oxygen to persons in the SIP room 709 in cases in which the persons have to remain in the room for an extended period of time.

To provide persons in the shelter 700 with detailed information on external hazards and internal hazards, the shelter 700 is additionally equipped with flammable gas detectors 717 and toxic gas detectors 718 at various locations around a periphery of the shelter 700 including at locations adjacent to doorways (e.g., on or near vestibule segments 103) and air intakes (e.g., 711). The external detectors 717, 718 enable real-time monitoring of conditions outside of the shelter 700, and in particular real-time monitoring of toxic hazards that may enter the shelter 700 through points of ingress.

Additionally, flammable gas detectors 717 and toxic gas detectors 718 are provided inside the shelter 700 to enable persons to monitor hazards and risks inside the shelter 700, including at an output of a duct 707 and adjacent to a doorway into the SIP room 709. The internal detectors 717, 718 enable real-time monitoring of conditions inside of the shelter 700, and in particular real-time monitoring of toxic hazards that may affect persons located inside the shelter 700 and/or that may enter the SIP room 709 through points of ingress. Detectors 717 and 718 can also be provided within the SIP room 709 to monitor air quality therein and enable persons located therein to determine whether evacuation is needed.

To control the HVAC systems and maintain air quality in the SIP room 709, the shelter includes an advanced HVAC controller 719 for controlling the heating, ventilation, and air conditioning (HVAC) systems. The HVAC controller 719 is configured to minimize gas ingress (e.g., toxic and/or flammable gas ingress) into the shelter 700, notably when external environmental hazards are detected as being present by the detectors 717, 718. In such a situation, the HVAC controller 719 controls the HVAC systems based on received sensing signals from the outside gas detectors 717, 718 disposed externally to the shelter 700 and uses the sensing information to control and disable air ingress into the shelter 700 and into the SIP room 709. For example, the HVAC controller 719 controls all exhaust/extraction fans 713 and associated dampers from kitchens, bathrooms, etc., to prevent them from pulling outside air into the building or allowing outside air to enter the building. For this purpose, the HVAC controller 719 is communicatively connected to the fans 713 and dampers. Through the use of the HVAC controller 719, air changes in the SIP room 709 can be kept below 0.1 ACPH (air changes per hour) by automatically shutting down the HVAC system and by closing dampers on vents along an external perimeter of the shelter 700 in response to detecting an elevated gas concentration or other hazard outside. This innovative HVAC controller 719 can also be used to shutdown HVAC systems and exhaust fans, actuate air cylinders 715, and provide emergency response data onto a monitor so that occupants know the concentration of toxic and flammable gases outside and inside of the shelter 700. This information can be linked with a site's security control system and provide necessary data to trigger emergency response procedures. The data can also be used by personnel inside the SIP room 709 to determine whether to shelter in place or evacuate by donning personal protection equipment (PPE).

In initial building design, the HVAC system sizing is designated to deal with normal comfort levels; additionally, emergency HVAC controls need to be selected and controlled with guidance to maintain low air infiltration into the building.

To perform the functions detailed above and enable the stopping of air circulation to the interior of a shelter 700, the HVAC controller 719 is communicatively connected to various systems through wired or wireless communication interfaces. For example, the HVAC controller 719 includes a gas detector interface for receiving measurements of a toxic/flammable gas concentration at locations of detectors 718, 719 positioned at locations exterior to the shelter 700 and interior to the building, and the controller is configured to compare received measurements with concentrations inside the building and/or with predetermined threshold concentrations to determine whether activation of isolation systems are needed.

The HVAC controller 719 further includes an HVAC control interface for controlling operation of the HVAC systems and HVAC air flow, for example to shut-down operation of HVAC systems, shut-down and restrict air flow into the building, and/or shut-down and restrict air flow through the ducts 707. For example, when the HVAC controller 719 determines that a measured concentration of toxic or flammable gas at a location exterior to the shelter 700 exceeds a threshold flammable/toxic concentration, the HVAC controller 719 controls shutdown of the HVAC air flow into the shelter 700 via an HVAC damper control interface. In this way, the HVAC controller 719 can control the closing of dampers (e.g., 703) and, optionally additionally, the shutdown of air flow through the building to minimize spreading of toxic or flammable gases within the shelter 700. In this way, the HVAC controller 719 maintains the integrity of air quality in the shelter 700 during a fire or toxic release.

Additionally, the HVAC controller 719 can monitor air temperature at various points throughout the shelter 700 to determine if the building is safe to inhabit during a fire event; and can monitor smoke and carbon dioxide ($CO_2$) buildup inside and outside of the shelter 700 to help determine whether to trigger an evacuation or to recommend persons shelter in place. In addition, the HVAC controller 719 can put the HVAC in recirculation mode and allow for smoke to be removed through the exhaust vent.

The HVAC controller 719 further monitors humidity and temperature conditions to prevent short circuits inside the building and to allow safe shutdown of electrical equipment as needed. In general, the HVAC controller 719 is provided with a dedicated uninterruptible power supply (UPS) to provide backup power and prevent loss of power thereto during a power outage due to an external fire or explosive event. A control panel of the HVAC controller 719 can be used to monitor the status of the UPS and alert personnel on the time remaining before evacuation may be necessary.

The HVAC controller 719 is further designed to perform automatic SIP calibration of the shelter 700 and to verify leak tightness of the shelter 700 on an ongoing basis. In this way, the HVAC controller 719 helps in re-use of the building as a toxic SIP building in a shorter time frame after a blast/fire event.

The HVAC controller 719 can further perform additional maintenance activities, such as periodically generating alarms to alert personnel if a gas sensor/detector 718, 719 has not been calibrated, generating general trouble alarms for UPS battery low voltage levels or faults, generating general trouble alarms for higher than normal average daily concentrations of toxic or flammable levels inside or outside the shelter 700, or the like.

The HVAC controller 719 is further configured to actuate release of fresh air from a pressurized source into the interior of the shelter 700 (and/or of the SIP room 709) upon determining that the measured gas concentration at the location exterior to the building exceeds the threshold flammable/toxic concentrations. Further, the HVAC controller 719 can monitor the concentration of flammable/toxic gases inside the shelter 70 and provide data to site security and management about any unsafe levels.

Figure 8:
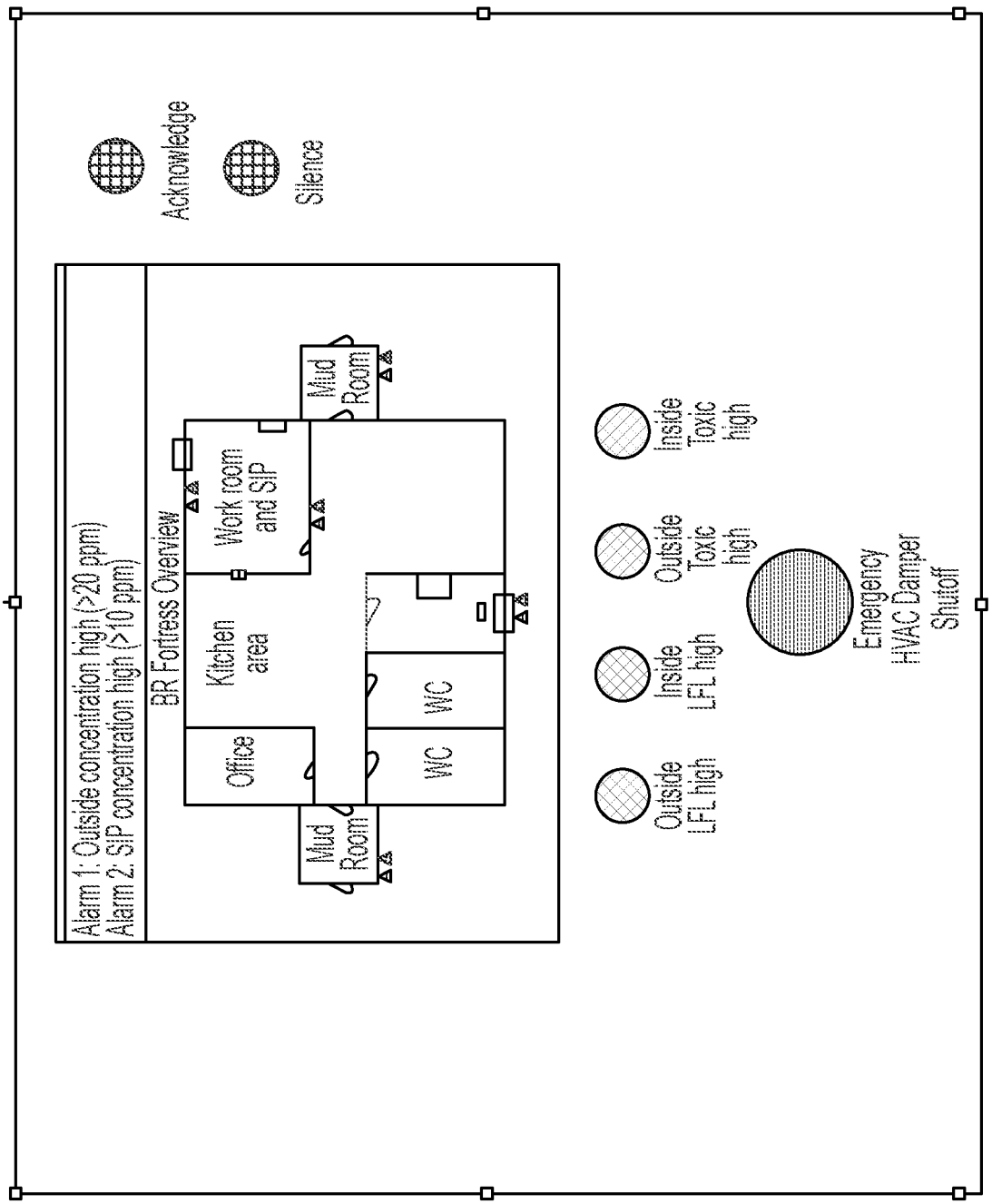
FIG. 8 shows an interface of an HVAC controller for use in modular safety shelters in accordance with the principles of the disclosure.

FIG. 8 shows an illustrative user interface that may be provided by the HVAC controller 719, for example on a touch-screen display provided thereon. The interface displays an image of the shelter 700 layout with identification locations of detectors 718, 719, and the possibility to display warning messages thereon. Additionally, control buttons (e.g., acknowledge and silence) enable users to interact with the controller. Indicators are provided to indicate elevated concentrations of flammable gases (e.g., concentrations exceeding a predetermined lower flammability limit (LFL) level) and toxic gases both inside the shelter 700 and outside thereof. Finally, an emergency HVAC damper shutoff switch enables a user to manually cause all external dampers to be closed in situations in which the HVAC controller 719 has not automatically caused all dampers to close.

In accordance with the foregoing description and attached drawings, a modular safety shelter 100 is provided that provides protection from blast, thermal, and toxic hazards. The shelter relies on compact concrete construction to achieve high blast resistance with minimal deflections compared to steel blast-resistant modular buildings. The modular construction offers different floor plan configurations and sizes, while enabling a rapid assembly of the shelter on site. A single-story structure does not require external foundation, and the structure is self-supporting (does not need an external foundation). Stacked (multi-story) structures can be achieved, for example by using pier foundations only (e.g., without requiring a slab). Individual module segments are connected to one another using modular connectors, and the modules/segments arrive on site fully assembled. The modular penetration design accommodates different types/sizes of equipment.

Based on the foregoing design and construction characteristics, the modular safety shelter 100 has a low occupant vulnerability and low equipment vulnerability. For instance, in the event of an 8 psi overpressure, testing has determined that wall deflection is only 1-inch. Furthermore, due to the low wall deflection, blast energy is not transferred to personnel or equipment inside, which limits the possibility of internal projectiles. As a result, the modular safety shelter 100 described herein has an inherently safer design.

Figure 9:
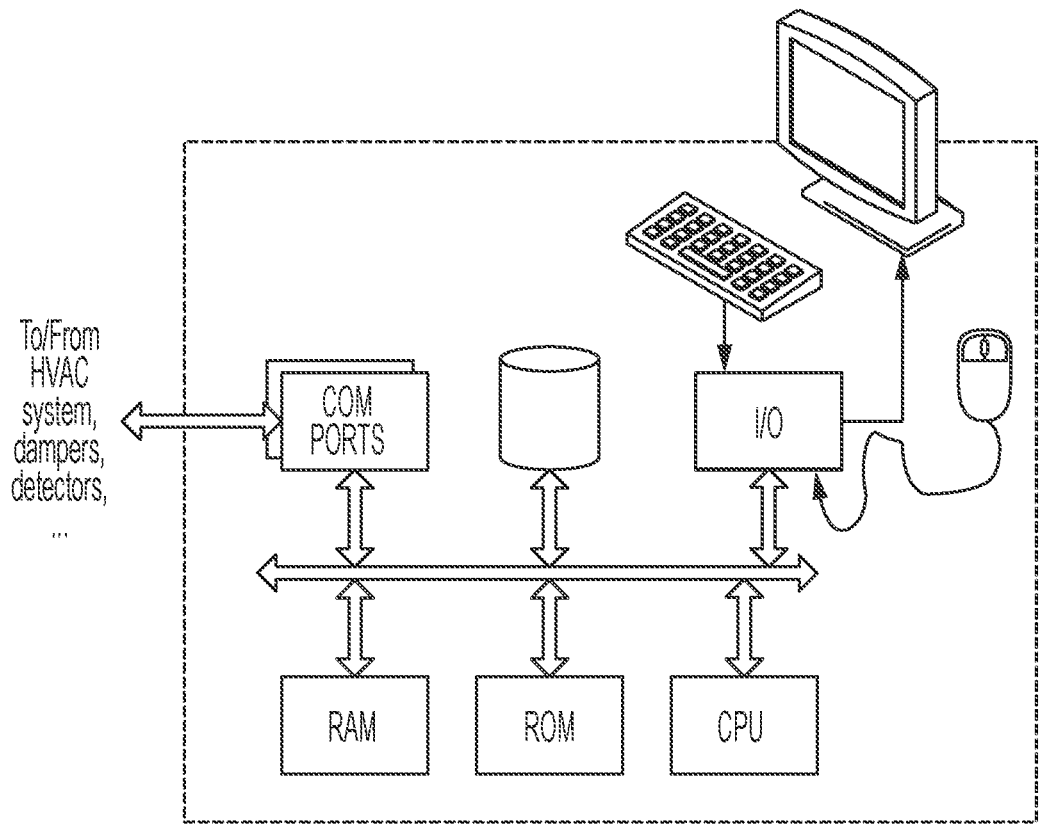
FIG. 9 is a simplified functional block diagram of an HVAC controller for use in modular safety shelters in accordance with the principles of the disclosure.

FIG. 9 shows a simplified functional block diagram of the HVAC controller 719 according to an embodiment of the disclosure. As shown, the HVAC controller 719 includes a central processing unit (CPU) including one or more processors, non-transitory memory in the form of a random access memory (RAM), a read-only memory (ROM), a disc drive, or other storage media configured to store program instructions for execution by the processors. The processor(s), upon executing the stored program instructions, cause the HVAC controller 719 to perform the various functions described herein based on sensing signals received from the detectors (717, 718). An input/output (I/O) interface is used for interfacing with users and includes a display, LED indicators, or other means of providing information to users, as well as a touch-sensitive panel and/or switches for receiving input from users. In addition, one or more communication interfaces allow the HVAC controller 719 to communicate with the HVAC system (e.g., via an HVAC control interface), the dampers (e.g., 703, 712, 714), sensors or detectors (e.g., 717, 718), and fresh air cylinders (715) to receive sensing signals therefrom and/or to output control signals thereto.

In this way, the processor of the HVAC controller 719 can determine whether a measured toxic or flammable gas concentration exceeds a threshold concentration based on sensing signals received from detectors 717, 718 through the communication interface, and can control the HVAC system to shut down air circulation via an HVAC control interface upon the measured toxic or flammable gas concentration exceeding the threshold concentration. The processor is further configured to actuate release of fresh air from the pressurized gas cylinders 715 into the interior of the shelter 700 upon determining that the measured toxic or flammable gas concentration at the location exterior to the shelter 700 exceeds the threshold concentration, and/or to monitor a concentration of toxic or flammable gas inside the building and provide data to site security and management upon determining that the toxic or flammable gas concentration inside the building is at an unsafe level.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A modular shelter providing resistance to fire, explosion, and toxic hazards occurring in an exterior thereof, comprising:
   two or more prefabricated modular segments each including a built-in foundation, a built-in roof, and one or more side walls extending between the built-in foundation and roof,
   wherein the built-in foundation, built-in roof, and one or more side walls of the modular segments are made of concrete;
   at least one prefabricated vestibule segment including a built-in foundation, a built-in roof, at least three side walls extending between the built-in foundation and roof, and external and interior doors disposed in respective side walls and respectively opening towards an exterior of the modular shelter and an interior of the vestibule segment, wherein the built-in foundation, built-in roof, and at least three side walls of the vestibule segment are made of concrete, wherein the walls and roof of the module segments and vestibule segment are constructed with monolithic beams and columns; and a joint seal sealing a plurality of joints between the two or more prefabricated module segments, wherein the joint seal comprises a thermally resistant backer rod disposed in the joint between the segments, a fire resistant intumescent sealant disposed in the joint to a side of the thermally resistant backer rod facing the exterior of the modular shelter, and a gas or water sealant disposed in the joint to a side of the fire resistant intumescent sealant facing the exterior of the modular shelter, and wherein the two or more prefabricated modular segments and the at least one prefabricated vestibule segment are configured to be attached to each other to provide a fully enclosed space within the modular shelter, and the vestibule segment extends beyond boundaries of the two or more prefabricated modular segments.

2. The modular shelter of claim 1, wherein at least one prefabricated vestibule segment includes an external door assembly including:

a door frame, having an opening, mounted in an opening of the at least one prefabricated concrete vestibule segment and welded to steel plates embedded in a side wall of the prefabricated vestibule segment; and the external door comprising a multi-layer door panel configured to fit in the opening of the door frame when the external door is closed, and including a blast-resistant door inner-frame having two vertical members and a plurality of cross-members extending between the two vertical members, a first thermal insulation layer disposed to substantially fill spaces between the vertical members and the cross-members of the door inner-frame, a second thermal insulation layer disposed between the door inner-frame and the exterior, and a steel panel mounted to the exterior of the blast-resistant door inner-frame.

3. The modular shelter of claim 1, further comprising:

a joint seal sealing a plurality of joints between the prefabricated module segments and the prefabricated vestibule segment to limit air ingress from outside to less than 0.1 air changes per hour.

4. The modular shelter of claim 1, further comprising:

a controller for a heating, ventilation, and/or air conditioning (HVAC) system configured to provide air circulation to the interior of the modular shelter, wherein the controller comprises a gas detector interface for receiving a measurement of a toxic or flammable gas concentration at a location exterior to the modular shelter, and a controller configured to control shutdown of air circulation provided by the HVAC system upon the measured toxic or flammable gas concentration exceeding a threshold concentration.

5. The modular shelter of claim 1, wherein the thermally resistant backer rod is formed of a ceramic fiber rope.

6. The modular shelter of claim 1, wherein the gas or water sealant comprises a medium-modulus elastomeric sealant designed for weatherproofing.

7. The modular shelter of claim 1, wherein the heat resistant gasket wherein the heat resistant gasket includes two gaskets, wherein a first outermost gasket includes a heat resistant silicone gasket, and a second gasket is a thermally resistant glass fiber gasket.

8. A modular shelter providing resistance to fire, explosion, and toxic hazards occurring in an exterior thereof, comprising:

two or more prefabricated modular segments each including a built-in foundation, a built-in roof, and one or more side walls extending between the built-in foundation and roof, wherein the built-in foundation, built-in roof, and one or more side walls of the modular segments are made of concrete;

at least one prefabricated vestibule segment including a built-in foundation, a built-in roof, at least three side walls extending between the built-in foundation and roof, and external and interior doors disposed in respective side walls and respectively opening towards an exterior of the modular shelter and an interior of the vestibule segment, wherein the built-in foundation, built-in roof, and at least three side walls of the vestibule segment are made of concrete;

wherein the walls and roof of the module segments and vestibule segment are constructed with monolithic beams and columns; and a joint seal sealing a plurality of joints between the two or more prefabricated module segments, wherein the joint seal comprises a thermally resistant backer rod disposed in the joint between the segments, a fire resistant intumescent sealant disposed in the joint to a side of the thermally resistant backer rod facing the exterior of the modular shelter, and a gas or water sealant disposed in the joint to a side of the fire resistant intumescent sealant facing the exterior of the modular shelter, wherein the two or more prefabricated modular segments and the at least one prefabricated vestibule segment are configured to be attached to each other to provide a fully enclosed space within the modular shelter, and the vestibule segment extends beyond boundaries of the two or more prefabricated modular segments, and wherein each side wall of each prefabricated segment is configured to deflect no more than 1 inch in response to a blast overpressure of up to 8 psig.

9. A modular shelter providing resistance to fire, explosion, and toxic hazards occurring in an exterior thereof, comprising:

two or more prefabricated modular segments each including a built-in foundation, a built-in roof, and one or more side walls extending between the built-in foundation and roof, wherein the built-in foundation, built-in roof, and one or more side walls of the modular segments are made of concrete;

at least one prefabricated vestibule segment including a built-in foundation, a built-in roof, at least three side walls extending between the built-in foundation and roof, and external and interior doors disposed in respective side walls and respectively opening towards an exterior of the modular shelter and an interior of the vestibule segment, wherein the built-in foundation, built-in roof, and at least three side walls of the vestibule segment are made of concrete;

a joint seal sealing a plurality of joints between the two or more prefabricated module segments, wherein the joint seal comprises a thermally resistant backer rod disposed in the joint between the segments, a fire resistant intumescent sealant disposed in the joint to a side of the thermally resistant backer rod facing the exterior of the modular shelter, and a gas or water sealant disposed in the joint to a side of the fire resistant intumescent sealant facing the exterior of the modular shelter, wherein the two or more prefabricated modular segments and the at least one prefabricated vestibule segment are configured to be attached to each other to provide a fully enclosed space within the modular shelter, and the vestibule segment extends beyond boundaries of the two or more prefabricated modular segments, and wherein the modular shelter insulates against a heat flux density of 100 kW/m² applied for 1 hour to an exterior wall such that air temperature in an interior of the modular shelter does not exceed 140° F.

10. A modular shelter providing resistance to fire, explosion, and toxic hazards occurring in an exterior thereof, comprising:

two or more prefabricated modular segments each including a built-in foundation, a built-in roof, and one or more side walls extending between the built-in foundation and roof, wherein the built-in foundation, built-in roof, and one or more side walls of the modular segments are made of concrete;

at least one prefabricated vestibule segment including a built-in foundation, a built-in roof, at least three side walls extending between the built-in foundation and roof, and external and interior doors disposed in respective side walls and respectively opening towards an exterior of the modular shelter and an interior of the vestibule segment, wherein the built-in foundation, built-in roof, and at least three side walls of the vestibule segment are made of concrete, and wherein the at least one prefabricated vestibule segment includes an external door assembly including:

a door frame, having an opening, mounted in an opening of the at least one prefabricated concrete vestibule segment and welded to steel plates embedded in a side wall of the prefabricated vestibule segment; and a multi-layer external door comprising:

a steel exterior door panel configured to fit in the opening of the door frame when the external door is closed, a heat resistant gasket providing a seal against penetration of gases, disposed between the door frame and the multi-layer external door along an entire periphery of the opening;

an interior cladding;

a blast-resistant door inner-frame mounted to an exterior of the interior cladding, the inner-frame having two vertical members, a top cross member extending between the two vertical members at a top of the vertical members, a bottom cross member extending between the two vertical members at a bottom of the vertical members, and a plurality of cross-members arranged between the top cross member and the bottom cross member extending between the two vertical members;

a first thermal insulation layer disposed to substantially fill spaces between the vertical members and the cross-members of the door inner-frame, wherein the steel exterior door panel is mounted to an exterior of the blast-resistant door inner-frame; and a second thermal insulation layer disposed between the blast-resistant door inner-frame and the steel exterior door panel.

11. The modular shelter of claim 10, wherein the interior cladding and the steel panel include ⅛-inch thick cold-formed steel sheet.

12. The modular shelter of claim 10, wherein the vertical members and the cross-members of the blast-resistant door inner-frame include hollow structural section (HSS) steel-tube members that are welded to each other.

13. The modular shelter of claim 10, wherein the first thermal insulation layer is formed of a mineral wool.

14. A modular shelter providing resistance to fire, explosion, and toxic hazards occurring in an exterior thereof, comprising:

two or more prefabricated modular segments each including a built-in foundation, a built-in roof, and one or more side walls extending between the built-in foundation and roof, wherein the built-in foundation, built-in roof, and one or more side walls of the modular segments are made of concrete;

at least one prefabricated vestibule segment including a built-in foundation, a built-in roof, at least three side walls extending between the built-in foundation and roof, and external and interior doors disposed in respective side walls and respectively opening towards an exterior of the modular shelter and an interior of the vestibule segment, wherein the built-in foundation, built-in roof, and at least three side walls of the vestibule segment are made of concrete, a joint seal sealing a plurality of joints between the two or more prefabricated module segments, wherein the joint seal comprises a thermally resistant backer rod disposed in the joint between the segments, a fire resistant intumescent sealant disposed in the joint to a side of the thermally resistant backer rod facing the exterior of the modular shelter, and a gas or water sealant disposed in the joint to a side of the fire resistant intumescent sealant facing the exterior of the modular shelter, wherein the at least one prefabricated vestibule segment includes an external door assembly including:

a door frame, having an opening, mounted in an opening of the at least one prefabricated concrete vestibule segment and welded to steel plates embedded in a side wall of the prefabricated vestibule segment; and a multi-layer external door comprising:

a steel exterior door panel configured to fit in the opening of the door frame when the external door is closed, a heat resistant gasket providing a seal against penetration of gases, disposed between the door frame and the multi-layer external door along an entire periphery of the opening;

an interior cladding;

a blast-resistant door inner-frame mounted to an exterior of the interior cladding, the inner-frame having two vertical members, a top cross member extending between the two vertical members at a top of the vertical members, a bottom cross member extending between the two vertical members at a bottom of the vertical members, and a plurality of cross-members arranged between the top cross member and the bottom cross member extending between the two vertical members;

a first thermal insulation layer disposed to substantially fill spaces between the vertical members and the cross-members of the door inner-frame, wherein the steel exterior door panel is mounted to an exterior of the blast-resistant door inner-frame; and a second thermal insulation layer disposed between the blast-resistant door inner-frame and the steel exterior door panel, wherein the two or more prefabricated modular segments and the at least one prefabricated vestibule segment are configured to be attached to each other to provide a fully enclosed space within the modular shelter, and the vestibule segment extends beyond boundaries of the two or more prefabricated modular segments; and a controller for a heating, ventilation, and/or air conditioning (HVAC) system configured to provide air circulation to the interior of the modular shelter, wherein the controller comprises a gas detector interface for receiving a measurement of a toxic or flammable gas concentration at a location exterior to the modular shelter, and the controller is configured to control shutdown of air circulation provided by the HVAC system upon the measured toxic or flammable gas concentration exceeding a threshold concentration.

15. The modular shelter of claim 14, wherein the controller is further configured to actuate release of fresh air from a pressurized source into the interior of the building upon determining that the measured toxic or flammable gas concentration at the location exterior to the building exceeds the threshold concentration.

16. The modular shelter of claim 14, wherein the controller further monitors a concentration of toxic or flammable gas inside the building and provides data to site security and management upon determining that the toxic or flammable gas concentration inside the building is at an unsafe level.

17. The modular shelter of claim 14, wherein the walls and roof of the module segments and vestibule segment are constructed with monolithic beams and columns, and the walls have horizontally oriented holes extending through a thickness thereof.

18. The modular shelter of claim 14, wherein the modular shelter insulates against a heat flux density of 100 kW/m$^2$ applied for 1 hour to an exterior wall such that air temperature in an interior of the modular shelter does not exceed 140° F.

19. The modular shelter of claim 14, further comprising:
a joint seal sealing a plurality of joints between the prefabricated module segments and the prefabricated vestibule segment to limit air ingress from outside to less than 0.1 air changes per hour.

* * * * *